United States Patent
Wei et al.

(10) Patent No.: US 10,393,417 B2
(45) Date of Patent: Aug. 27, 2019

(54) HEAT PUMP UNIT CONTROL SYSTEM WITH ENHANCED VAPOR INJECTION CAPABILITIES FOR UPSTREAM AND DOWNSTREAM LIQUID EXTRACTION

(71) Applicant: Gree Electric Appliances, Inc. of Zhuhai, Zhuhai (CN)

(72) Inventors: Feng Wei, Zhuhai (CN); Haidong Lin, Zhuhai (CN); Weiping Zheng, Zhuhai (CN); Chuanhua Wang, Zhuhai (CN); Si Sun, Zhuhai (CN); Chengsong Wu, Zhuhai (CN); Enquan Zhang, Zhuhai (CN)

(73) Assignee: Gree Electric Appliances, Inc. of Zhuhai, Guangdong (CN)

( * ) Notice: Subject to any disclaimer, the term of this patent is extended or adjusted under 35 U.S.C. 154(b) by 0 days.

(21) Appl. No.: 15/768,370

(22) PCT Filed: Oct. 14, 2016

(86) PCT No.: PCT/CN2016/102193
§ 371 (c)(1),
(2) Date: Apr. 13, 2018

(87) PCT Pub. No.: WO2017/063591
PCT Pub. Date: Apr. 20, 2017

(65) Prior Publication Data
US 2018/0306473 A1    Oct. 25, 2018

(30) Foreign Application Priority Data

Oct. 16, 2015 (CN) .......................... 2015 1 0675964

(51) Int. Cl.
*F25B 40/02* (2006.01)
*F25B 41/04* (2006.01)
(Continued)

(52) U.S. Cl.
CPC .............. *F25B 40/02* (2013.01); *F25B 13/00* (2013.01); *F25B 41/003* (2013.01); *F25B 41/04* (2013.01);
(Continued)

(58) Field of Classification Search
CPC .............. F25B 40/02; F25B 2600/0261; F25B 2400/0401; F25B 2400/0409;
(Continued)

(56) References Cited

U.S. PATENT DOCUMENTS 8,899,058 B2 * 12/2014 Unezaki ................. F25B 13/00
62/197

FOREIGN PATENT DOCUMENTS

CN      102937347 A     2/2013
CN      103322710 A     9/2013
(Continued)

*Primary Examiner* — Edward F Landrum
*Assistant Examiner* — Daniel C Comings
(74) *Attorney, Agent, or Firm* — The Webb Law Firm

(57) ABSTRACT

A heat pump unit control system, comprising a heat exchanger, a compressor, a first switching element, a second switching element, an enhanced vapor injection electronic expansion valve, and a main circuit electronic expansion valve. A first end of the compressor is connected to a first port of the heat exchanger by the first switching element and the enhanced vapor injection valve, a second port of the heat exchanger is connected to an injection end of the compressor, the end of the first switching element connected to the compressor is connected to a third port of the heat exchanger, a fourth port of the heat exchanger is connected to a second end of the compressor by the main circuit valve, and the end of the first switching element connected to the enhanced vapor injection valve is connected to the fourth port of the heat exchanger by the second switching element.

16 Claims, 4 Drawing Sheets

(51) Int. Cl.
*F25B 13/00* (2006.01)
*F25B 41/00* (2006.01)
*F25B 49/02* (2006.01)

(52) U.S. Cl.
CPC .......... *F25B 49/02* (2013.01); *F25B 2400/04* (2013.01); *F25B 2400/0401* (2013.01); *F25B 2400/0409* (2013.01); *F25B 2400/0411* (2013.01); *F25B 2400/05* (2013.01); *F25B 2400/054* (2013.01); *F25B 2400/13* (2013.01); *F25B 2600/0261* (2013.01); *F25B 2600/2501* (2013.01); *Y02B 30/72* (2013.01)

(58) Field of Classification Search
CPC .......... F25B 2400/0411; F25B 2400/05; F25B 2400/054
See application file for complete search history.

(56) References Cited

FOREIGN PATENT DOCUMENTS

| | | | | |
|---|---|---|---|---|
| CN | 203396155 | * | 1/2014 | .............. F25B 30/06 |
| CN | 203396155 | U | 1/2014 | |
| CN | 203657295 | U | 6/2014 | |
| CN | 104534723 | A | 4/2015 | |
| CN | 105258393 | A | 1/2016 | |
| CN | 205174925 | U | 4/2016 | |
| JP | 5681549 | B2 | 3/2015 | |

\* cited by examiner

HEAT PUMP UNIT CONTROL SYSTEM WITH ENHANCED VAPOR INJECTION CAPABILITIES FOR UPSTREAM AND DOWNSTREAM LIQUID EXTRACTION

CROSS-REFERENCE TO RELATED APPLICATIONS

This application is the United States national phase of International Application No. PCT/CN2016/102193 filed Oct. 14, 2016, and claims priority to Chinese Patent Application No. 201510675964.0 filed Oct. 16, 2015, the disclosures of which are hereby incorporated in their entirety by reference.

BACKGROUND OF THE INVENTION

Technical Field

The present disclosure relates to the field of refrigeration, and in particular to a heat pump unit control system.

Description of Related Art

The technology of enhanced vapor injection allows a heat pump to obtain a higher refrigerating (heating) capacity and also improves the system efficiency by providing an economizer. For a heat pump system with enhanced vapor injection with a subcooler, a plate heat exchanger is often used as an economizer to improve the subcooling degree of the refrigerant before it enters the evaporator. It includes upstream liquid extraction and downstream liquid extraction according to the position of liquid extraction of the injection circuit.

The advantage of upstream liquid extraction is that, the main circuit throttling electronic expansion valve and the auxiliary circuit electronic expansion valve do not affect each other, the system is stable, the required capacity of the plate heat exchanger is small, and the economic efficiency is high. The disadvantage of the upstream liquid extraction is that, liquid extraction may fail when the subcooling degree at the outlet of the condenser is insufficient, which results in no obvious air injection effect and affects the unit performance.

The advantage of downstream liquid extraction is that, it is better ensure the subcooling degree before the auxiliary circuit enhanced vapor injection electronic expansion valve and ensure sufficient liquid supply for the auxiliary injection circuit, especially for the conditions of low temperature and even ultra-low temperature heating, thereby reducing the possibility of loss of control of the superheat degree of the enhanced vapor injection electronic expansion valve because of lack of subcooling before the electronic expansion valve. The disadvantage of downstream liquid extraction is that, the main circuit and auxiliary circuit electronic expansion valves (enhanced vapor injection electronic expansion valves) will affect each other, the system is oscillate and unstable, and the pressure loss of the refrigerant is increased when passing through the main channel. Therefore, the system needs an economizer with a greater heat exchange capacity, which increases the cost.

Enhanced vapor injection heat pump unit systems use one of upstream liquid extraction and downstream liquid extraction.

SUMMARY OF THE INVENTION

Embodiments of the present disclosure provide a heat pump unit control system, which has a simple structure, and has upstream and downstream liquid extraction control manners, so that upstream liquid extraction and downstream liquid extraction complement each other and effectively ensure the economic efficiency, performance and reliability of the unit.

The embodiments of the present disclosure provide a heat pump unit control system comprising a heat exchanger, a compressor, a first switching element, a second switching element, an enhanced vapor injection electronic expansion valve, and a main circuit electronic expansion valve. A first end of the compressor is connected to a first port of the heat exchanger successively by the first switching element and the enhanced vapor injection electronic expansion valve, a second port of the heat exchanger is connected to an injection end of the compressor, the end of the first switching element connected to the compressor is connected to a third port of the heat exchanger, a fourth port of the heat exchanger is connected to a second end of the compressor by the main circuit electronic expansion valve, and an end of the first switching element connected to the enhanced vapor injection electronic expansion valve is connected to the fourth port of the heat exchanger by the second switching element.

In one or more embodiments, the heat pump unit control system further comprises a shell tube, and the first end of the compressor is connected to the first switching element by the shell tube.

In one or more embodiments, the heat pump unit control system further comprises a gas-liquid separator, and the shell tube is connected to the first end of the compressor by the gas-liquid separator.

In one or more embodiments, the heat pump unit control system further comprises a four-way valve, and the shell tube is connected to the gas-liquid separator by the four-way valve.

In one or more embodiments, the heat pump unit control system further comprises a fin, and the main circuit electronic expansion valve is connected to the second end of the compressor successively by the fin and the four-way valve.

In one or more embodiments, a filter is provided on the pipeline connecting the shell tube and the first switching element and/or the four-way valve.

In one or more embodiments, the heat pump unit control system is configured to form an upstream liquid extraction circuit when the first switching element is open and the second switching element is closed.

In one or more embodiments, the heat pump unit control system is configured to form a downstream liquid extraction circuit when the second switching element is turned on and the first switching element is turned off.

In one or more embodiments, the first switching element and the second switching element are both electromagnetic valves.

In one or more embodiments, the heat exchanger is a plate heat exchanger.

The embodiments of the present disclosure provide a heat pump unit control system comprising a heat exchanger and a compressor.

The heat exchanger comprises a first branch and a second branch, wherein the inlet of the second branch is in communication with one of an outlet of the first branch and the first end of the compressor, and the outlet of the second branch is in communication with the injection end of the compressor.

In one or more embodiments, the heat pump unit control system is wherein it further comprises a first switching element and a second switching element.

The first switching element is disposed between the first end of the compressor and a first port serving as an inlet of the second branch, and the second switching element is disposed between the first port and a fourth port serving as an outlet of the first branch.

In one or more embodiments, the heat pump unit control system is configured to be in a condition of an upstream liquid extraction when the first switching element is open and the second switching element is closed.

In one or more embodiments, the heat pump unit control system is configured to be in a condition of a downstream liquid extraction when the second switching element is open and the first switching element is closed.

In one or more embodiments, the heat pump unit control system is configured to be in the condition of the upstream liquid extraction under refrigeration and high temperature heating conditions.

In one or more embodiments, the heat pump unit control system is configured to be in the condition of the downstream liquid extraction under low temperature heating and super-low temperature heating conditions.

The embodiments of the present disclosure have upstream and downstream liquid extraction control manners, so that upstream liquid extraction and downstream liquid extraction complement each other to avoid respective disadvantages, so that the heat pump unit control system is economic efficiency, performance and reliability.

Explanation of the reference signs: 1. heat exchanger; 2. compressor; 3. first switching element; 4. second switching element; 5. enhanced vapor injection electronic expansion valve; 6. main circuit electronic expansion valve; 7. first port; 8. second port; 9. third port; 10. fourth port; 11. shell tube; 12. gas-liquid separator; 13. four-way valve; 14. fin; 15. filter; 16. one-way valve; 17. pressure sensor; 18. injected air bulb; 19. main circuit; 20. auxiliary circuit; 21. injection end; 22. first end; 23. second end; 25. one-way valve; 26. filter; 27. filter; 28. filter; 111. air tube port of the shell tube; 112. liquid tube port of the shell tube; 121. gas-liquid separator inlet; 122. gas-liquid separator outlet; 141. air tube port of the fin; 142. liquid tube port of the fin; 210. filter.

DESCRIPTION OF THE INVENTION

The present disclosure will be further described in detail in combination with the drawings and embodiments, but they are not limitations to the present disclosure.

Figure 1:
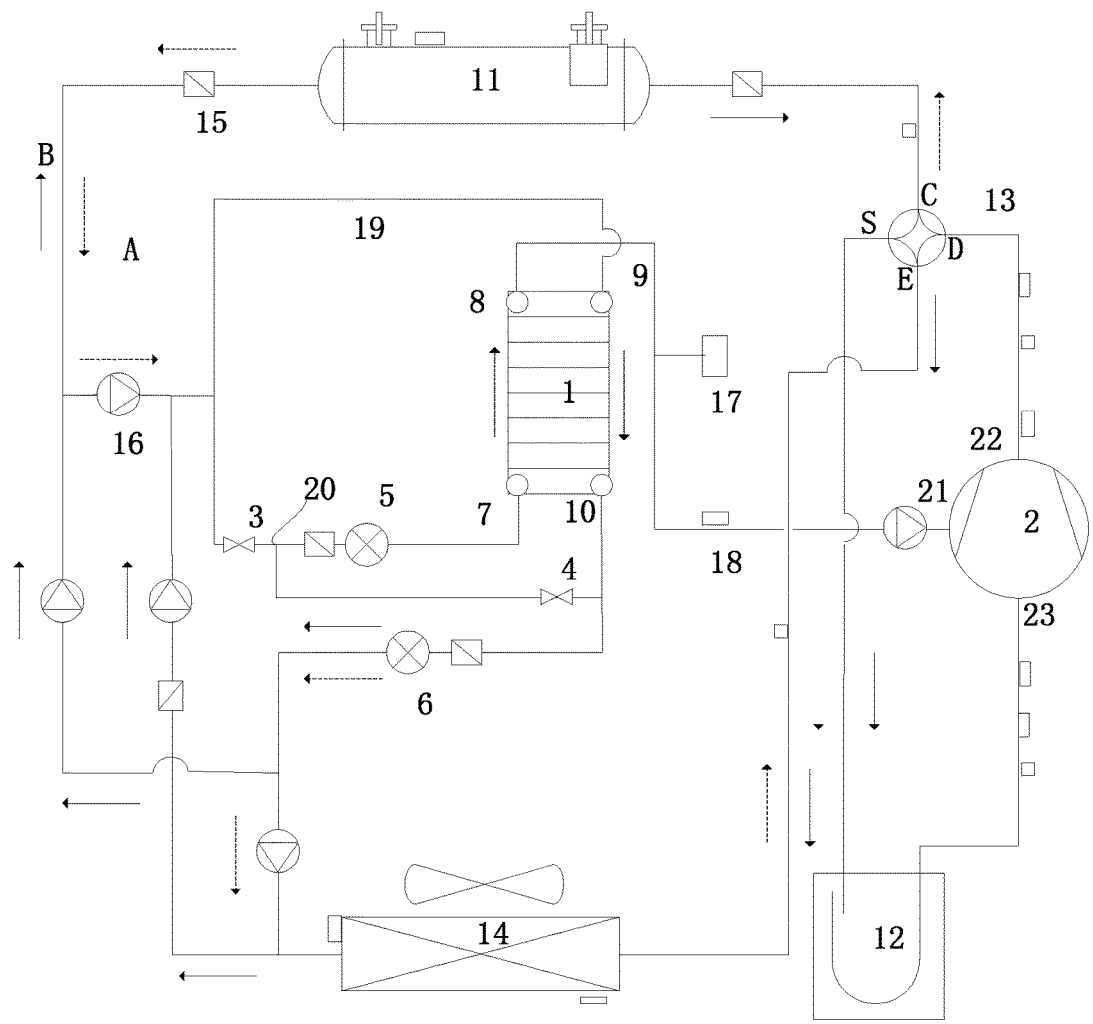
FIG. 1 is a schematic diagram of the overall structure of embodiments.
Figure 2:
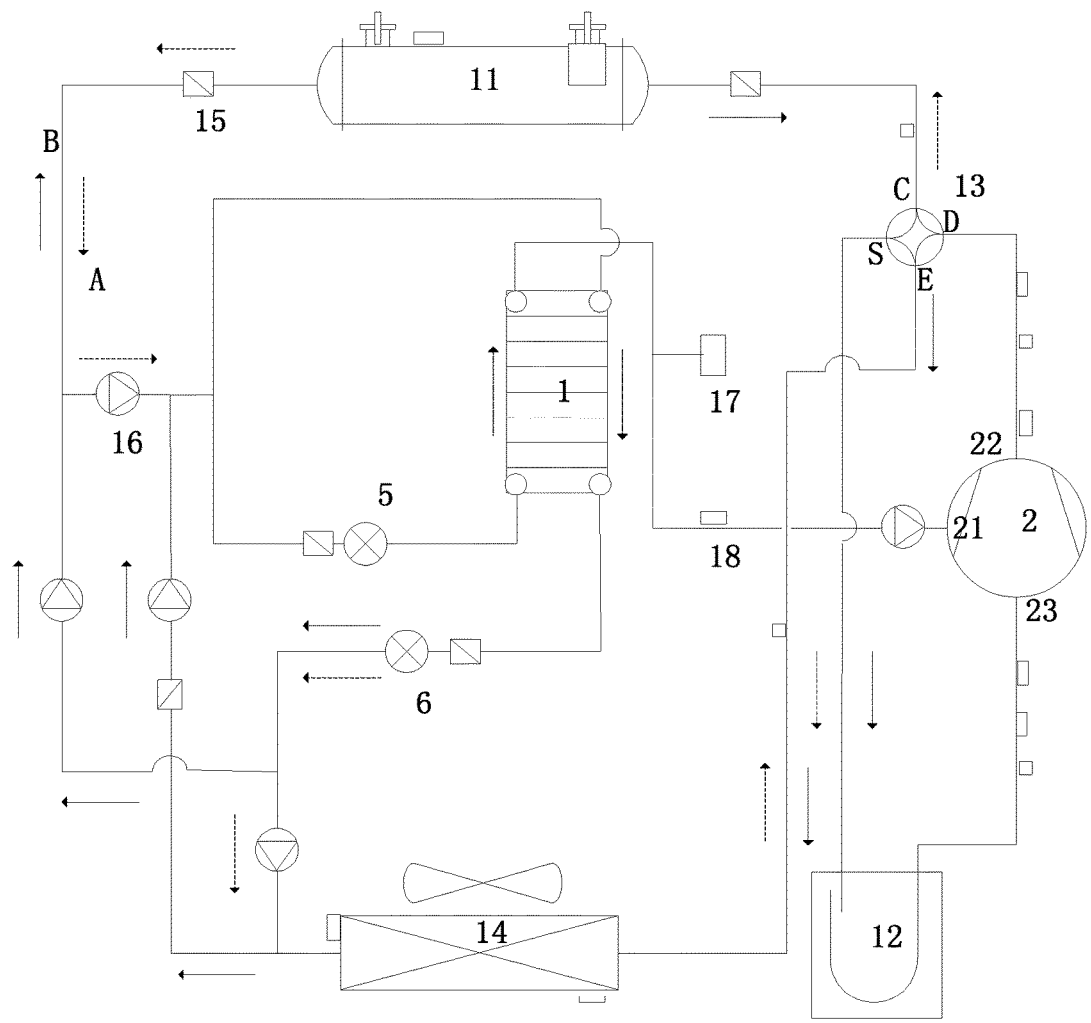
FIG. 2 is a schematic diagram of embodiments when an upstream liquid extraction circuit is formed.
Figure 3:
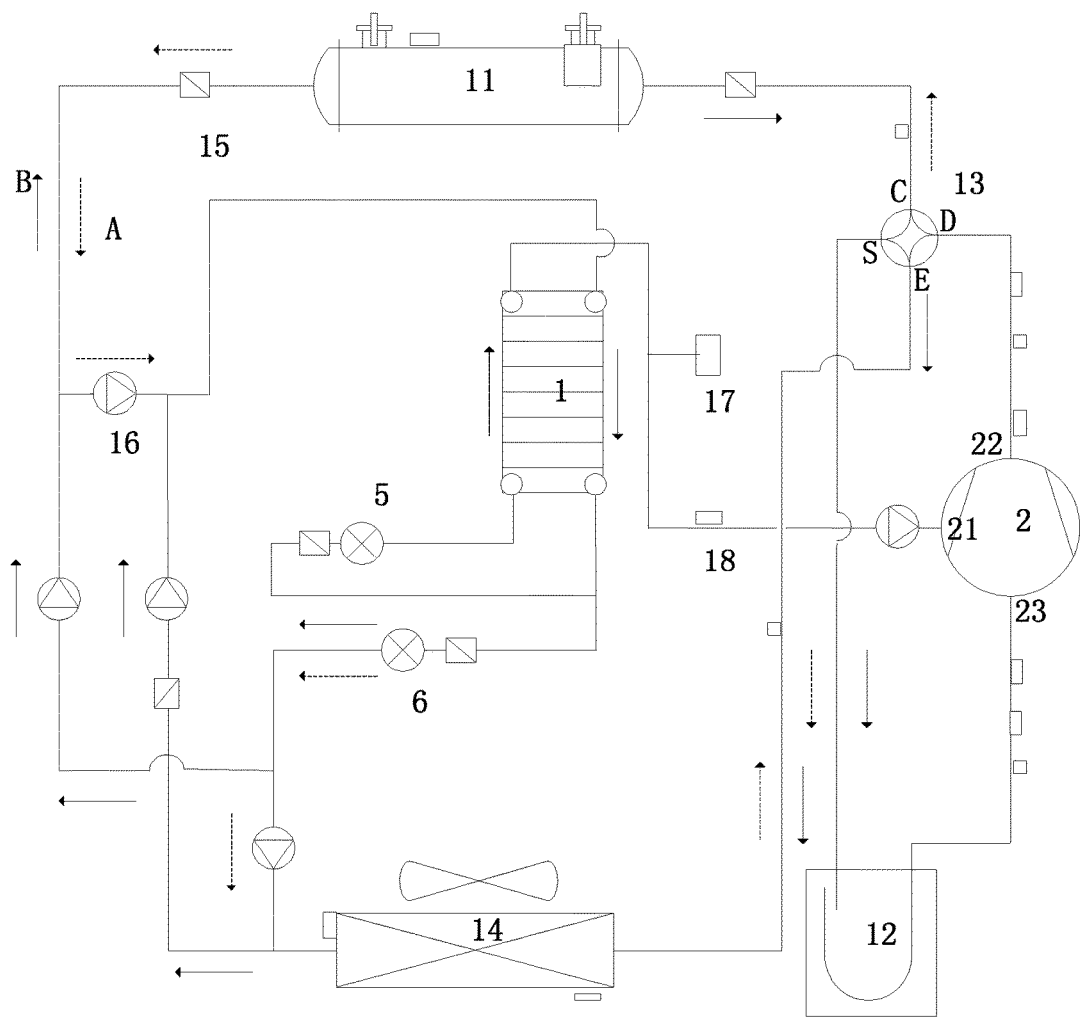
FIG. 3 is a schematic diagram of embodiments when a downstream liquid extraction circuit is formed.

With reference to FIG. 1 to FIG. 3, embodiments of the present disclosure provide a heat pump unit control system comprising a heat exchanger 1, a compressor 2, a first switching element 3, a second switching element 4, an enhanced vapor injection electronic expansion valve 5 and a main circuit electronic expansion valve 6. A first end 22 of the compressor 2 is connected to a first port 7 of the heat exchanger 1 successively by the first switching element 3 and the enhanced vapor injection electronic expansion valve 5. A second port 8 of the heat exchanger 1 is connected to an injection end 21 of the compressor 2. The end of the first switching element 3 connected to the compressor 2 is connected to a third port 9 of the heat exchanger 1. A fourth port 10 of the heat exchanger 1 is connected to a second end 23 of the compressor 2 by the main circuit electronic expansion valve 6. The end of the first switching element 3 connected to the enhanced vapor injection electronic expansion valve 5 is connected to the fourth port 10 of the heat exchanger 1 by the second switching element 4.

The upper end of the compressor 2 is the first end 22, the lower end is the second end 23, and the left end is the injection end 21. The upper end of the compressor 2 serves as an exhaust port, the lower end serves as an intake port, and the left end serves as an injection port (or "air supplement port").

In some embodiments, the heat exchanger 1 is a subcooler (a form of economizer), and four ports (first port 7, second port 8, third port 9 and fourth port 10) of the heat exchanger 1 are all for the same medium to pass through. The flow direction is the same during refrigeration and heating. The main circuit medium enters from the third port 9 and comes out of the fourth port 10. The main circuit medium releases heat in the heat exchanger 1 and becomes a subcooled refrigerant. The auxiliary circuit medium enters from the first port 7 and comes out of the second port 8. The auxiliary circuit medium absorbs heat in the heat exchanger 1 and becomes a superheated refrigerant.

It has upstream liquid extraction and downstream liquid extraction according to the position of liquid extraction of the injection circuit. When the first switching element 3 is turned on and the second switching element 4 is turned off, it is upstream liquid extraction. Upstream liquid extraction refers to that the liquid extraction position of the part of the refrigerant injected to the injection end 21 of the compressor for an effect of enhanced vapor injection is before the exchanger 1, i.e., the system refrigerant has been separated into two paths before passing through the heat exchanger 1 (before entering the third port 9). When the first switching element 3 is turned off and the second switching element 4 is turned on, it is downstream liquid extraction. Downstream liquid extraction refers to that the liquid extraction position of the part of the refrigerant injected to the injection end 21 of the compressor for an effect of enhanced vapor injection is after the exchanger 1, i.e., the system refrigerant is separated into two paths after passing through the heat exchanger 1 (after entering from the third port 9 and coming out of the fourth port 10).

When the first switching element 3 is turned off and the second switching element 4 is turned on, it is downstream liquid extraction. The branch where the first switching element 3 is located is turned off, and the branch where the second switching element 4 is located is turned on.

The flow direction of refrigerant in downstream liquid extraction is as follows: all the refrigerant first passes through the pipeline of the main circuit 19, enters the heat exchanger 1 from the third port 9 for heat release and cooling to become a subcooled refrigerant which comes out of the fourth port 10; and then is separated into two paths of refrigerant: most of the subcooled refrigerant is throttled by the main electronic expansion valve 6, the other small portion of the subcooled refrigerant passes through the pipeline of the auxiliary circuit 20 after passing through the second switching element 4, and is throttled by the enhanced vapor injection electronic expansion valve 5 into a gas-liquid two-phase refrigerant which enters the heat exchanger 1 from the port 7 and absorbs heat in the heat exchanger 1 to become a superheated vapor refrigerant which then flows out of the second port 8 and then is injected into the compressor 2 via the injection port 21 for enhanced vapor injection.

When the first switching element 3 is turned off and the second switching element 4 is turned on, it is upstream liquid extraction. The branch where the first switching element 3 is located is turned on, and the branch where the second switching element 4 is located is turned off.

The flow direction of refrigerant in upstream liquid extraction is as follows: the refrigerant is separated into two paths before passing through the pipeline of the main circuit 19. After the refrigerant is separated, most of the refrigerant passes through the pipeline of the main circuit 19, enters the heat exchanger 1 from the third port 9 to release heat and to be cooled to become a subcooled refrigerant. Then the refrigerant is throttled by the main circuit electronic expansion valve 6 after coming out of the fourth port 10. The other small portion of the subcooled refrigerant passes through the pipeline of the auxiliary circuit 20 after passing through the first switching element 3, and is throttled by the enhanced vapor injection electronic expansion valve 5 into a gas-liquid two-phase refrigerant which enters the heat exchanger 1 from the first port 7 and absorbs heat in the heat exchanger 1 to become a superheated vapor refrigerant which flows out of the second port 8 and then is injected into the compressor 2 via the injection port 21 for enhanced vapor injection.

Optionally, the first switching element 3 and the second switching element 4 are both electromagnetic valves. When the first switching element 3 and the second switching element 4 are turned on, they are in communication with respective pipelines where they are located, and when they are turned off, the respective pipelines where they are located are disconnected, so as to achieve upstream liquid extraction or downstream liquid extraction.

Optionally, the heat exchanger 1 is a plate heat exchanger. The refrigerant in one branch of the heat exchanger 1 releases heat and is cooled, while the refrigerant in the other branch absorbs heat and is superheated. The plate heat exchanger has the advantages of a high heat exchange efficiency, a compact structure, and so on. Here the heat exchanger is also referred to as a "subcooler".

As shown in FIG. 1 to FIG. 3, during heating, the flow direction of embodiments are shown by the arrows A (dotted lines) in FIGS. 1 to 3; during refrigeration, the flow direction of embodiments are shown by the arrows B (solid lines) in FIG. 1 to FIG. 3.

Since the above technical solution is adopted, the heat pump unit control system in embodiments have two liquid extraction manners: upstream liquid extraction and downstream liquid extraction. For example, upstream liquid extraction is formed when the first switching element 3 is turned on and the second switching element 4 is turned off, and downstream liquid extraction is formed when the second switching element 4 is turned on and the first switching element 3 is turned off. Upstream liquid extraction or downstream liquid extraction are chosen according to liquid supply to reasonably design the size of the economizer (i.e., the heat exchanger) of the unit.

With the technical solution of embodiments, the manner of upstream liquid extraction is adopted under refrigeration and high temperature heating conditions. Under low temperature heating and super-low temperature heating conditions, the circulation volume of refrigerant of the unit is relatively small, and the liquid extraction effect is not good, downstream liquid extraction is adopted to improve the liquid extraction effect of the unit.

In embodiments, the high temperature heating condition of the system specifically refers to a heating condition in which the ambient dry-bulb temperature>−5° C.

In embodiments, the low temperature heating condition of the system refers to a heating condition in which −5° C.> ambient dry-bulb temperature>−15° C., and super-low temperature heating condition refers to a heating condition in which −15° C.> ambient dry-bulb temperature>−30° C.

Therefore, embodiments have upstream and downstream liquid extraction control manners, so that upstream liquid extraction and downstream liquid extraction complement each other to avoid respective disadvantages, which effectively improve the economic efficiency, performance (capability and energy efficiency) and reliability of the unit.

The embodiments improve liquid extraction effect under any working condition of the unit, thereby effectively improving the capability, energy efficiency and economic efficiency of the unit, effectively lowering the exhaust temperature of the compressor, and ensuring the reliability of the compressor.

Optionally, the heat pump unit control system further comprises a shell tube 11, and the first end of the compressor 2 is connected to the first switching element 3 by the shell tube 11. The shell tube heat exchanger is a condenser during heating, which provides the user with hot water, and an evaporator during refrigeration, which provides the user with cold water.

Optionally, the heat pump unit control system further comprises a gas-liquid separator 12, and the shell tube 11 is connected to the first end of the compressor 2 by the gas-liquid separator 12. The gas-liquid separator 12 serves to separate gas and liquid to ensure that the intake port of the compressor inhales gaseous vapor and prevent the inhaled gas from carrying liquid.

Optionally, the heat pump unit control system further comprises a four-way valve 13, and the shell tube 11 is connected to the gas-liquid separator 12 by the four-way valve 13. The four-way valve 13 can switch between refrigeration mode and heating mode.

Optionally, the heat pump unit control system further comprises a fin 14, and the main circuit electronic expansion valve 6 is connected to the second end of the compressor 2 successively by the fin 14 and the four-way valve 13. The finned heat exchanger is an evaporator during heating, which absorbs heat from the air, and a condenser during refrigeration, which releases heat into the air.

Optionally, a filter 15 is provided on the pipeline connecting the shell tube 11 and the first switching element 3 and/or the four-way valve 13. The function of the filter 15 is to filter the system impurities and prevent failure of the unit due to blockage of key components of the system, for example, key components is an electronic expansion valve.

Optionally, with reference to FIG. 2, the heat pump unit control system forms an upstream liquid extraction circuit when the first switching element 3 is turned on and the second switching element 4 is turned off. For example, under working conditions where the liquid supply is sufficient, especially during refrigeration and high temperature heating, upstream liquid extraction is adopted. The mutual influence between the enhanced vapor injection electronic expansion valves 5 on the main subcooling circuit (i.e., the main circuit 19) and the auxiliary circuit 20 is small, fluctuation and oscillation of the system are small, which is not affect the system performance and reliability while improving the stability of the system.

Optionally, with reference to FIG. 3, the heat pump unit control system forms a downstream liquid extraction circuit when the second switching element 4 is open and the first switching element 3 is closed. For example, under working conditions where the liquid supply is insufficient, especially during low temperature and even super-low temperature heating, downstream liquid extraction is adopted. Firstly, subcooling is conducted and then liquid is extracted to ensure sufficient liquid supply, such that the injection circuit can obtain enough liquid to ensure the effect of enhanced vapor injection, ensure the effective control of the exhaust temperature by enhanced vapor injection, and improve the reliability of the compressor and capability and energy efficiency of the system during low temperature heating.

Optionally, a pressure sensor 17 and an injected air bulb 18 are further provided on the connecting pipeline between the second port 8 of the heat exchanger 1 and the air injecting port of the compressor. The pressure sensor 17 and the injected air bulb 18 can calculate the superheat degree of injected air, and the superheat degree of injected air=the temperature measured by the injected air bulb 18—the saturation temperature corresponding to the pressure measured by the pressure sensor 17. The superheat degree of injected air is usually controlled at 3° C.~8° C. The opening degree of the enhanced vapor injection electronic expansion valve 5 is adjusted and reduced when the superheat degree of injected air<3° C., and the opening degree of the enhanced vapor injection electronic expansion valve 5 is adjusted and increased when the superheat degree of injected air>8° C.

In particular, the heat pump assembly control system in the embodiments of the present disclosure further comprise a plurality of one-way valves 16. The one-way valves 16 can control the flow direction of the refrigerant, and the same main circuit electronic expansion valve 6 is used during refrigeration and heating.

Figure 4:
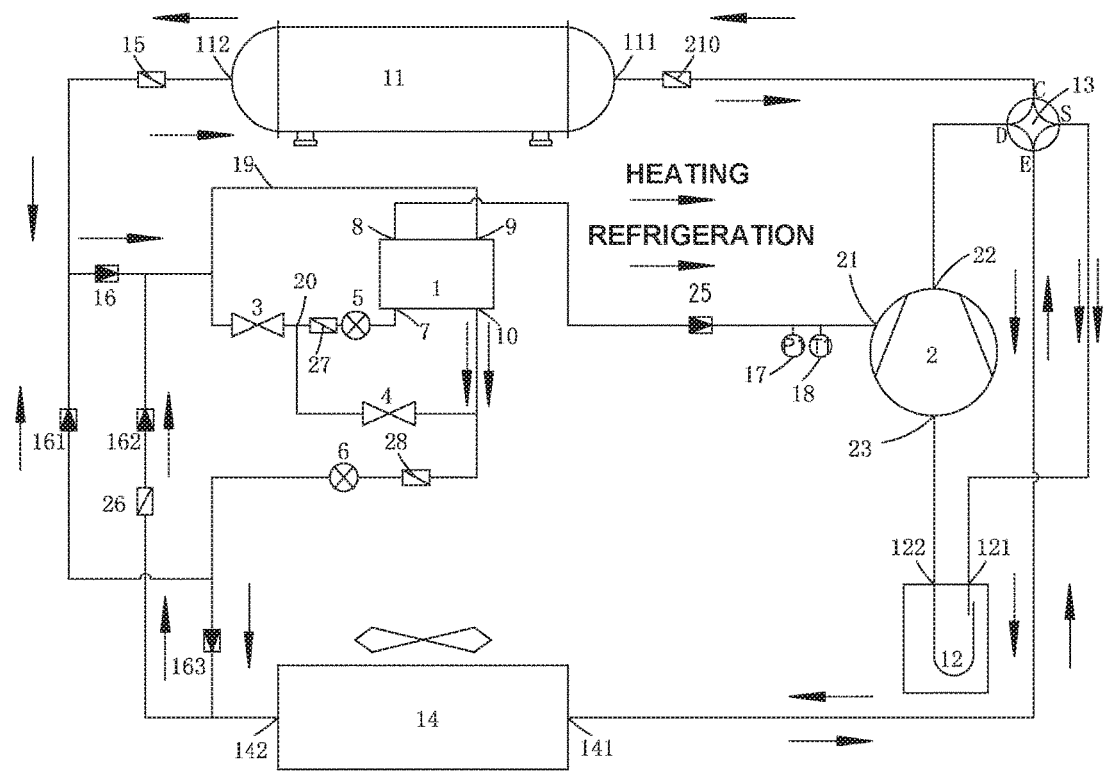
FIG. 4 is a schematic diagram of the overall structure of one or more embodiments.

The specific implementation of another embodiments are described below. Please refer to FIG. 4.

The first switching element 3 is open and the second switching element 4 is closed: upstream liquid extraction.

1.1 Upstream Liquid Extraction for Refrigeration

The D end of the four-way valve 13 is in communication with the E end, and the S end is in communication with the C end; the first switching element 3 is open, and the second switching element 4 is closed.

High-temperature and high-pressure gaseous refrigerant working medium discharged from the second end 22 of the compressor 2 passes through the four-way valve 13 from the D end and E end and enters the finned heat exchanger 14 via the air tube port 141 of the fin to release heat to the air and is condensed into a high-temperature and high-pressure liquid refrigerant, which comes out of the liquid tube port 142 of the fin, passes through the third filter 26 and is then separated into main circuit and auxiliary circuit refrigerant (the main circuit accounts for most of the refrigerant, and the auxiliary circuit accounts for a small portion of the refrigerant). The main circuit refrigerant enters the heat exchanger 1 from the third port 9 via the main circuit 19 for further cooling and heat release to become a subcooled refrigerant, which comes out of the fourth port 10, and then is throttled and depressurized by the sixth filter 28 to become a gas-liquid two-phase refrigerant (here, the function of the one-way valves 16, 161, 162, and 163 is to make the main circuit and auxiliary circuit refrigerants flow in the same direction during refrigeration and heating, and the refrigerant is depressurized after passing through the throttle valve, which can achieve differential pressure seal; if at this time, the refrigerant is depressurized after passing through the sixth filter 28, it cannot pass through the one-way valve 163 because the pressure of the refrigerant coming out of the liquid tube port 142 of the fin is high, and so on). The refrigerant which is throttled and depressurized by the sixth filter 28 and becomes a gas-liquid two-phase refrigerant then passes through the one-way valve 162 and the first filter 15, enters the shell tube via the liquid tube port 112 of the shell tube to evaporate and absorb the heat of the secondary refrigerant to realize refrigeration function. The low-temperature and low-pressure gaseous refrigerant coming out of the air tube port 111 of the shell tube passes through the second filter 210, then passes through the C end and S end of the four-way valve 13, and enters the gas-liquid separator 12 from 1201 for gas-liquid separation. The gaseous refrigerant comes out of the gas-liquid separator outlet 122 and enters the compressor 2 from the second end 23 to be compressed, then the main circuit refrigeration circulation is completed. The auxiliary circuit refrigerant passes through the first switching element 3 and the auxiliary circuit 20, passes through the filter 27 and then enters the enhanced vapor injection electronic expansion valve 5 to be throttled and depressurized to become a gas-liquid two-phase refrigerant, which enters the heat exchanger 1 from the first port 7 to absorb heat and evaporate to become superheated vapor, which passes through the injected air bulb 18 and is then injected from the injection end 21 into the compressor to be compressed, then the auxiliary circuit refrigerant circulation is completed.

1.2 Downstream Liquid Extraction for Heating

The D end of the four-way valve 13 is in communication with the C end, and the S end is in communication with the E end; the first switching element 3 is open, and the second switching element 4 is closed.

High-temperature and high-pressure gaseous refrigerant working medium discharged from the first end 22 of the compressor 2 passes through the four-way valve 13 from the D end and the C end, passes through the filter 210 and then enters the shell tube 11 from the air tube port 111 of the shell tube to release heat to the secondary refrigerant to realize the heating function, which is condensed into a high-temperature and high-pressure liquid refrigerant which comes out of the liquid tube port 112 of the shell tube and passes through the filter 15 and the one-way valve 16. It is then separated into main circuit and auxiliary circuit refrigerants (the main circuit accounts for most of the refrigerant, and the auxiliary circuit accounts for a small portion of the refrigerant). The main circuit refrigerant enters the heat exchanger 1 from the third port 9 via the main circuit 19 for further cooling and heat release to become a subcooled refrigerant, which comes out of the fourth port 10 and then passes through the filter 28 to be throttled and depressurized to become a gas-liquid two-phase refrigerant. The refrigerant which is throttled and depressurized by the filter 28 and becomes a gas-liquid two-phase refrigerant passes through the one-way valve 163, enters the fin from the liquid tube port 142 of the fin to evaporate and absorb the heat of the air. The low-temperature and low-pressure gaseous refrigerant coming out of the air tube port 141 of the fin passes through the E end and the S end of the four-way valve 13, enters the gas-liquid separator 12 from the gas-liquid separator inlet 121 for gas-liquid separation. The gaseous refrigerant comes out of 122 and enters the compressor 2 from the second end 23 to be compressed, then the main circuit heating circulation is completed. The auxiliary circuit refrigerant passes through the first switching element 3 and the auxiliary circuit 20, passes through the filter 27 and then enters the enhanced vapor injection electronic expansion valve 5 to be throttled and depressurized to become a gas-liquid two-phase refrigerant, which enters the heat exchanger 1 from the first port 7 to absorb heat and evaporate to become superheated vapor, which passes through the injected air bulb 18 and is then injected from the injection end 21 into the compressor to be compressed, then the auxiliary circuit refrigerant circulation is completed.

2. The First Switching Element 3 is Closed, the Second Switching Element 4 is Open: Downstream Liquid Extraction 2.1 Downstream Liquid Extraction for Refrigeration The D end of the four-way valve 13 is in communication with the E end, and the S end is in communication with the C end; the first switching element 3 is closed, and the second switching element 4 is open.

High-temperature and high-pressure gaseous refrigerant working medium discharged from the first end 22 of the compressor 2 passes through the four-way valve 13 from the D end and E end, enters the finned heat exchanger 14 via the air tube port 141 of the fin to release heat into the air, and is condensed into a high-temperature and high-pressure liquid refrigerant, which comes out of the liquid tube port 142 of the fin and passes through the filter 26 and the one-way valve 162, then the refrigerant enters the heat exchanger 1 from the third port 9 via the main circuit 19 for further cooling and heat release to become a subcooled refrigerant which comes out of the fourth port 10 and is then separated into main circuit and auxiliary circuit refrigerants (the main circuit accounts for most of the refrigerant, and the auxiliary circuit accounts for a small portion of the refrigerant). The main circuit refrigerant passes through the filter 28 to be throttled and depressurized to become a gas-liquid two-phase refrigerant. The refrigerant which is throttled and depressurized by the filter 28 and becomes a gas-liquid two-phase refrigerant passes through the one-way valve 163 and the filter 15, and enters the shell tube via the liquid tube port 112 of the shell tube to evaporate and absorb the heat of the secondary refrigerant to realize the refrigeration function. The low-temperature and low-pressure gaseous refrigerant coming out of the air tube port 111 of the shell tube passes through the second filter 210, then passes through the C end and S end of the four-way valve 13, and enters the gas-liquid separator 12 from the gas-liquid separator inlet 121 for gas-liquid separation. The gaseous refrigerant comes out of the gas-liquid separator outlet 122 and enters the compressor 2 from the second end 23 to be compressed, then the main circuit refrigeration circulation is completed. The auxiliary circuit refrigerant passes through the second switching element 4 and the auxiliary circuit 20, passes through the filter 27 and then enters the enhanced vapor injection electronic expansion valve 5 to be throttled and depressurized to become a gas-liquid two-phase refrigerant, which enters the heat exchanger 1 from the first port 7 to absorb heat and evaporate to become superheated vapor, which passes through the one-way valve 25 and is then injected from the injection end 21 into the compressor to be compressed, then the auxiliary circuit refrigerant circulation is completed.

2.2 Downstream Liquid Extraction for Heating

The D end of the four-way valve 13 is in communication with the C end, and the S end is in communication with the E end; the first switching element 3 is closed, and the second switching element 4 is open.

High-temperature and high-pressure gaseous refrigerant working medium discharged from the first end 22 of the compressor 2 passes through the four-way valve 13 from D end and C end, passes the filter 210 and then enters the shell tube 11 from the air tube port 111 of the fin to release heat to the secondary refrigerant to realize heating function and is condensed into a high-temperature and high-pressure liquid refrigerant, which flows out of the liquid tube port 112 of the fin and passes through the filter 15 and the one-way valve 16, then the refrigerant enters the heat exchanger 1 from the third port 9 via the main circuit 19 for further cooling and heat release to become a subcooled refrigerant which comes out of the fourth port 10 and is then separated into main circuit and auxiliary circuit refrigerants (the main circuit accounts for most of the refrigerant, and the auxiliary circuit accounts for a small portion of the refrigerant). The main circuit refrigerant passes through the filter 28 to be throttled and depressurized to become a gas-liquid two-phase refrigerant. The refrigerant which is throttled and depressurized by the filter 28 and becomes a gas-liquid two-phase refrigerant passes through the one-way valve 163, enters the fin from the liquid tube port 142 of the fin to evaporate and absorb the heat of the air. The low-temperature and low-pressure gaseous refrigerant coming out of the air tube port 141 of the fin passes through the E end and the S end of the four-way valve 13, enters the gas-liquid separator 12 from the gas-liquid separator inlet 121 for gas-liquid separation. The gaseous refrigerant comes out of the gas-liquid separator outlet 122 and enters the compressor 2 from the second end 23 to be compressed, then the main circuit refrigeration circulation is completed. The auxiliary circuit refrigerant passes through the second switching element 4 and the auxiliary circuit 20, passes through the filter 27 and then enters the enhanced vapor injection electronic expansion valve 5 to be throttled and depressurized to become a gas-liquid two-phase refrigerant, which enters the heat exchanger 1 from the first port 7 to absorb heat and evaporate to become superheated vapor, which passes through the one-way valve 25 and is then injected from the injection end 21 into the compressor to be compressed, then the auxiliary circuit refrigerant circulation is completed.

With reference to FIG. 1, some embodiments disclosure provide a heat pump unit control system comprising a heat exchanger 1 and a compressor 2. The heat exchanger 1 comprises a first branch and a second branch, wherein the inlet of the second branch can be in communication with one of the outlet of the first branch and the first end 22 of the compressor 2, and the outlet of the second branch is in communication with the injection end 21 of the compressor 2.

In the present embodiments, the passage between the third port 9 and the fourth port 10 of the heat exchanger 1 serves as the first branch, and the passage between the first port 7 and the second port 8 of the heat exchanger 1 serves as the second branch. The third port 9 serves as the inlet of the first branch, the fourth port 10 serves as the outlet of the first branch; the first port 7 serves as the inlet of the second branch, and the second port 8 serves as the outlet of the second branch.

The inlet of the second branch (i.e., the first port 7) is in communication with the outlet of the first branch (i.e., the fourth port 10), or the inlet of the second branch (i.e., the first port 7) is in communication with the first end 22 of the compressor 2. The former of the two communication manners forms downstream liquid extraction and the latter forms upstream liquid extraction. The liquid extraction manner can be chosen according to the actual requirements.

The present embodiments choose upstream or downstream liquid extraction in the following manner. The heat pump unit control system further comprises a first switching element 3 and a second switching element 4. The first switching element 3 is disposed between the first end 22 of the compressor 2 and the first port 7 serving as the inlet of the second branch, and the second switching element 4 is disposed between the first port 7 and the fourth port 10 serving as the outlet of the first branch. One of the first switching element 3 and the second switching element 4 is turned on.

The manner of liquid extraction can be chosen by controlling the on/off state of the first switching element 3 and the second switching element 4.

With reference to FIG. 1, the heat pump unit control system forms upstream liquid extraction when the first switching element 3 is open and the second switching element 4 is closed.

With reference to FIG. 1, the heat pump unit control system forms downstream liquid extraction when the second switching element 4 is open and the first switching element 3 is closed. In this way, upstream liquid extraction or downstream liquid extraction can be chosen according to liquid supply to reasonably design the size of the economizer (i.e., the heat exchanger) and ensure the economic efficiency of the unit.

Please refer to the above description about the content which will not be repeated here.

In the embodiments of the present disclosure, the heat pump unit control system adopts upstream liquid extraction under refrigeration and high temperature heating conditions.

In the present embodiments, the high temperature heating condition of the system specifically refers to a heating condition in which the ambient dry-bulb temperature>−5° C.

In the present embodiments, the low temperature heating condition of the system refers to a heating condition in which −5° C.> ambient dry-bulb temperature>−15° C., and super-low temperature heating condition refers to a heating condition in which −15° C.> ambient dry-bulb temperature>−30° C.

In the present embodiments, the heat pump unit control system adopts downstream liquid extraction under low temperature heating and super-low temperature heating conditions.

Therefore, the embodiments of the present disclosure can simultaneously have upstream and downstream liquid extraction control manners, so that upstream liquid extraction and downstream liquid extraction complement each other to avoid respective disadvantages as much as possible, which effectively ensures the unity of economic efficiency, performance (capability and energy efficiency) and reliability of the unit.

Of course, the above are optional embodiments of the present disclosure. It should be set forth that, for a person skilled in the art, on the premise of not departing away from the basic principles of the present disclosure, improvements and modifications may also be made, and such improvements and modifications are also deemed to be within the protection scope of the present disclosure.

The invention claimed is:

1. A heat pump unit control system, comprising a heat exchanger, a compressor, a first switching element, a second switching element, an enhanced vapor injection electronic expansion valve, and a main circuit electronic expansion valve; wherein:
   a first end of the compressor is connected to a first port of the heat exchanger successively by the first switching element and the enhanced vapor injection electronic expansion valve;
   a second port of the heat exchanger is connected to an injection end of the compressor;
   an end of the first switching element in fluid communication with the compressor and a third port of the heat exchanger;
   a fourth port of the heat exchanger is connected to a second end of the compressor by the main circuit electronic expansion valve; and
   an end of the first switching element connected to the enhanced vapor injection electronic expansion valve is connected to the fourth port of the heat exchanger by the second switching element.

2. The heat pump unit control system of claim 1, further comprising a shell tube, wherein the first end of the compressor is connected to the first switching element by the shell tube.

3. The heat pump unit control system of claim 2, further comprising a gas-liquid separator, wherein the shell tube is connected to the first end of the compressor by the gas-liquid separator.

4. The heat pump unit control system of claim 3, further comprising a four-way valve, wherein the shell tube is connected to the gas-liquid separator by the four-way valve.

5. The heat pump unit control system of claim 4, further comprising a fin, wherein the main circuit electronic expansion valve is connected to the second end of the compressor successively by the fin and the four-way valve.

6. The heat pump unit control system of claim 4, wherein a filter is provided on either a pipeline connecting the shell tube and the first switching element or a pipeline connecting the shell tube and the four-way valve.

7. The heat pump unit control system of claim 4, wherein a first filter is provided on a pipeline connecting the shell tube and the first switching element, and a second filter is provided on the pipeline connecting the shell tube and the four-way valve.

8. The heat pump unit control system of claim 1, wherein the heat pump unit control system is configured to form an upstream liquid extraction circuit when the first switching element is open and the second switching element is closed.

9. The heat pump unit control system of claim 1, wherein the heat pump unit control system is configured to form a downstream liquid extraction circuit when the second switching element is open and the first switching element is closed.

10. The heat pump unit control system of claim 1, wherein the first switching element and the second switching element are both electromagnetic valves.

11. The heat pump unit control system of claim 1, wherein the heat exchanger is a plate heat exchanger.

12. A heat pump unit control system, comprising a heat exchanger, a first switching element, a second switching element, and a compressor; wherein:
   the heat exchanger comprises a first branch and a second branch, wherein an inlet of the second branch is in communication with one of an outlet of the first branch and a first end of the compressor, and an outlet of the second branch is in communication with an injection end of the compressor;
   the first switching element is disposed between the first end of the compressor and a first port serving as an inlet of the second branch;
   the second switching element is disposed between the first port and a fourth port serving as an outlet of the first branch; and
   one of the first switching element and the second switching element is open.

13. The heat pump unit control system according to claim 12, wherein the heat pump unit control system is configured to be in a condition of an upstream liquid extraction when the first switching element is open and the second switching element is closed.

14. The heat pump unit control system according to claim 13, wherein the heat pump unit control system is configured for upstream liquid extraction during refrigeration and high temperature heating conditions.

15. The heat pump unit control system according to claim 12, wherein the heat pump unit control system is configured to be in a condition of a downstream liquid extraction when the second switching element is open and the first switching element is closed.

16. The heat pump unit control system according to claim 15, wherein the heat pump unit control system is configured for downstream liquid extraction during low temperature heating and super-low temperature heating conditions.

* * * * *